United States Patent Office 3,362,884
Patented Jan. 9, 1968

3,362,884
METHOD OF PREPARATION OF PURIFIED AGAR
Philip Morse, La Habra, Calif., assignor to
Hyland Laboratories
No Drawing. Filed May 6, 1965, Ser. No. 453,829
10 Claims. (Cl. 195—7)

This invention is concerned with a procedure for the preparation of a purified agar fraction.

Agar is the dried hydrophilic colloidal substance extracted from *Gelidium cartilogineum* (Linne) Gaillon (Fan. Gelidiaceae), *Gracilaria confervoides* (Linne) Greville (Fan. Sphaerococcaceae), and related red algae (Class Rhodobhyceae). The red-purple seaweeds from which agar is obtained grow in nearly all of the oceans of the world. In one method for the preparation of agar, seaweed is harvested and washed, and the agar is extracted from the seaweed under conditions of high temperature and pressure. Impurities are precipitated and removed by filtration, and the liquor is permitted to gel. After gelation, the agar is frozen for several days. Agar is insoluble in ice, and certain impurities go into the ice which is later melted and washed away. The agar is washed, decolorized, sterilized, treated for the removal of the small amount of remaining impurities and washed again. After dehydration, the agar is ready for packaging and marketing. This resultant product is the conventional agar of commerce that enjoys a wide variety of uses, including uses in dentistry, criminology, plastic surgery, museum preparations, sculpturing, food processing, medical research, microbiology, photography, and chemistry and science in general.

Agar consists of two fractions, a neutral galactose polymer and a sulfated polysaccharide (agaropectin). The agaropectin fraction imparts to the neutral galactose polymer properties which are considered to be undesirable for certain purposes and in certain applications. The neutral galactose polysaccharide contains no charged groups, and a gel of this polysaccharide, therefore, is highly suitable as a stabilizing agent for electrophoresis and immunodiffusion. Agar from which the agaropectin fraction has been removed has other distinct advantages. When employed for use in microbiological media it provides a gel of surprisingly high gel strength, even when considerably smaller amounts of it are employed than are usually employed in the use of conventional agars for such purposes. Gels formed from this purified faction of agar exude very small amounts of water of syneresis, as compared to conventional agar gels.

The recognition of peculiar advantages in the use of the neutral galactose polymer as a gelation material has led investigators to attempt to devise methodology for the efficient, rapid and inexpensive separation of it from agar. That such efforts have not been outstandingly successful is evidenced by the fact that the neutral galactose polymer of commerce is presently some fifty times more expensive than is the agar of commerce. An acetylation method for the preparation of the neutral galactose polymer has been proposed by Araki, J. Chem. Soc., Japan, Pure Chem. Soc., 58 (1937), 1338. This acetylation method has been described by Hjerten as very tedious and expensive. In an attempt to improve upon the acetylation method, Hjerten devised a cetylpyridinium chloride method. Biochem. Biophys. Acta 62 (1962), 445. Disadvantages in the cetylpyridinium chloride method of Hjerten led other investigators to devise a method which depended on fractional precipitation with polyethylene glycol, Russell et al., Biochem. Biophys. Acta 86 (1964), 169–174. Attempts have been made to desulfate agar by treatment with dry hydrochloric acid; however, this treatment resulted in the degradation of the agar. The agaropectin fraction of agar can be removed by extraction from a warm agar solution utilizing resins. However, the low capacity of resin columns when employed for this purpose make this method unsuitable. A principal disadvantage of almost all of the prior processes is that the purification of the agar must be performed on an agar solution. This necessitates working with a hot molten substance, a circumstance which increases the difficulty and expense of the processing.

It is an object of the present invention to provide methodology for the rapid, efficient and inexpensive production of the neutral galactose polymer from agar.

It is a further object to provide methodology which permits the preparation of the neutral galactose polymer from agar in the cold at from about 60° F. to 160° F.

It is yet another object of this invention to provide methodology for the preparation of the neutral galactose polymer from agar utilizing inexpensive and readily obtainable chemicals.

Other objects and advantageous features of the invention will become apparent from the following detailed, illustrative examples.

The instant inventive concept is based upon a technique whereby the agaropectin portion of agar is solubilized through the use of either materials which degrade the agaropectin (the pectinase family of enzymes) or which sequester calcium and thereby permit the solubilizing of the agaropectin (sequesterants such as ethylene diamine tetraacetic acid and certain phosphates). The solubilized agaropectin is then readily removed from the neutral galactose polymer by washing with water, preferably distilled or deionized water.

In one embodiment of the present invention, pectinase is added to agar. Pectinases are commercially available from a number of sources. They are used extensively in the processing of fruits. Pectinase, under aqueous conditions, will degrade the agaropectin moiety of agar into smaller units which are water soluble. These water soluble degradation products can then be removed by washing the insoluble neutral galactose polymer with either cold or warm water.

In a second embodiment of the invention, the agaropectin is rendered cold-water soluble through the removal of calcium ions by sequesterants. Representative of such sequesterants are dibasic sodium phosphate, tribasic sodium phosphate, sodium pyrophosphates, sodium triphosphate, sodium hexametaphosphate, sodium tripolyphosphate and ethylene diamine tetraacetic acid. Once the calcium ions have been sequestered and rendered unavailable for combination with the agaropectins, the agaropectins become water-solubilized and can be removed by washing the insoluble neutral galactose polymer with cold or warm water. It is understood, of course, that the calcium sequesterant must not be of such a chemical nature or used in such a manner that it causes degradation of the neutral galactose polymer moiety.

For solubilization of the agaropectin component of agar, there is utilized per pound of agar from about five to fifty grams of pectinase in the form of a pectinase enzyme preparation having a Quince juice activity of 200 units per gram. Preferably, about twenty-five grams of such an enzyme preparation will be used per pound of agar. The solubilization of the agaropectins proceeds at temperatures suitable for pectinase enzyme activity, generally on the order of from about 100° F. to 140° F. and preferably, at about 105° F. After the solubilization has proceeded satisfactorily, for about from one to twenty-four hours and, preferably, for about four hours, the neutral galactose polymer is washed free of the agaropectins with water, preferably with distilled or deionized water. The galactose polymer may then be bleached to improve color and clarity using a conventional bleach such as sodium hypochlorite solution. Following bleaching, the polymer is washed until free of residual bleach components or reaction products. It is then dried by any method which will remove water without damage or destruction to the neutral galactose polymer. Such drying methods include drying by the use of a vacuum cabinet, organic solvents, such as acetone, alcohol, or ether, or by some other suitable method.

In the preceding paragraph the pectinase enzyme activity was expressed in terms of Quince juice units of activity. This is a conventional means for representing pectinase activity. It is based upon the degree to which the enzyme will clarify a Quince juice substrate. A pectinase enzyme preparation of the type employed in the practice of this invention and the method of its preparation from *Aspergillus niger* growth products are disclosed in South African Patent No. 63/5936. It was this pectinase preparation which was employed in Example I, which follows.

The solubilization of agaropectins utilizing calcium sequesterants utilizes much the same methodology as is utilized for the pectinase process. In the use of the phosphate type of calcium sequesterant, the appropriate phosphate is added to agar in water. For one pound of agar, from about 100 to 1,000 grams of the phosphate is utilized. The sequestering of the calcium is preferably conducted in distilled or deionized water at temperatures of from about 100° F. to 160° F., preferably 105° F., for from about one to twenty-four hours, preferably about twelve hours. The neutral galactose polymer is then washed free of the agaropectins with water, preferably distilled or deionized water. The galactose polymer may then be bleached to improve color and clarity using a conventional bleach such as sodium hypochlorite solution. Following bleaching, the polymer is washed and dried as is indicated above for the pectinase process. In the use of other types of calcium sequesterants, such as the ethylene diamine tetraacetic acids and salts, the process is substantially the same as the process which utilizes the phosphates. For the solubilization of the agaropectins in one pound of agar, from about one to 100 grams of EDTA or its alkali metal salts are employed.

The neutral galactose polymer prepared by the method of this invention is useful as a gel-forming material and stabilizing agent for electrophoresis and immunodiffusion. For such techniques, it is desirable that a gel have excellent transparency and that the gel permit diffusion of material, e.g. antigens and antibodies, with as little impedance, either by adsorption or by some other mechanism, as is possible. If an agar contains appreciable amounts of charged particles which are capable of combining with the materials under investigation and which thereby impede the diffusion of these materials in response to the imposition of an electrical charge, such an agar is not suitable for gel diffusion and immunoelectrophoresis. The neutral galactose polymer prepared by the methods of this invention provides extremely clear and transparent gel structures. Furthermore, this neutral galactose polymer permits the unimpeded diffusion of charged materials, e.g. antigens and antibodies, in both gel diffusion applications and in immunoelectrophoretic applications.

The neutral galactose polymer of this invention has also been found to be extremely useful for the production of improved microbiological semi-solid culture plates, tubes and slants. In the heretofore conventional manufacture of microbiological semi-solid culture tubes, plates, and slants, it has been a usual practice to employ on the order of about 2% of conventional agar. If less than this 2% quantity is employed, the semi-solid media which result do not have sufficient structural integrity to withstand many of the conditions to which they may routinely be exposed. It has been found that 1% of the neutral galactose polymer of this invention will provide a semi-solid medium having the same order of gel strength as is provided by 2% of conventional agar. Furthermore, water of syneresis is virtually absent from plates, tubes and slants which incorporate the neutral galactose polymer of this invention.

The following examples are given to illustrate the practice of the invention and are not to be construed as limiting the scope. Many variations and changes are possible without departing from the coverage of the appended claims.

*Example I*

Twety-five grams of a liquid pectinase enzyme preparation having a Quince juice activity of 200 units per gram were added to eight liters of distilled water at room temperature. The distilled water was then warmed to 104° F. One pound of agar was placed in the enzyme-water solution and allowed to remain in the solution, in contact with the pectinase enzyme, for four hours. The residual undissolved neutral galactose polymer was then washed free of the added enzyme and the solubilized agaropectins, using distilled water. To eight liters of distilled water, there was then added 100 ml. of a 5.25% sodium hypochlorite solution. The neutral galactose polymer was placed in this bleach solution and allowed to remain in contact with the bleach for one hour. The polymer, after removal from the bleach solution, was washed in distilled water until free of all residual free chlorine. The polymer was then dried in a vacuum cabinet.

The neutral galactose polymer prepared by the procedure of the above Example I may be used for both gel diffusion and immunoelectrophoresis. When 2% of this polymer is added to 100 ml. of a veronal buffer at a pH of 8.6, ionic strength 0.05, and the mixture is warmed to 200° F., a clear water-like solution is obtained. When the proper amount of this solution is poured and allowed to gel in an electrophoresis plate, a very clear transparent medium is obtained. When the analytical sample is added and the electrical charge is imposed on the system, according to conventional procedures, unusually clearly delineated component bands can be visualized.

*Example II*

To one pound of agar in eight liters of water at room temperature, there were added 1,000 grams of sodium hypophosphate, and the admixture, in distilled water, was warmed from room temperature to 110° F. After twelve hours, the agar fraction, comprising the neutral galactose polymer, was washed free of the added hypophosphate and the agaropectin fraction, using distilled water. The washed, neutral galactose polymer was then permitted to remain in contact with a bleach solution for one hour. This bleach solution was prepared by adding 100 ml. of a 5.25% sodium hypochlorite solution to eight liters of distilled water. The neutral galactose polymer was then removed from the bleach solution and was washed in distilled water until free of all residual free chlorine. The polymer was then dried in a vacuum tray drier.

*Example III*

The procedure of Example III was practiced, using sodium tripolyphosphate as a calcium sequesterant in place of the sodium hypophosphate of Example II.

*Example IV*

Fifty grams of tetrasodium ethylene diamine tetracetate were added to eight liters of distilled water at room temperature, and the water was warmed to 140° F. One pound of agar was placed in this water solution and was allowed to remain in the solution for four hours. The tetrasodium EDTA during this period of time chelated the calcium ions present in the solution, thereby rendering water-soluble the agaropectins. The insoluble, neutral galactose polymer was removed from the chelating solution and was washed free of all agaropectins and the added tetrasodium EDTA, using distilled water. The polymer was placed in a bleach solution and permitted to remain there for one hour. This bleach solution was prepared in the manner of the bleach solution described in Example II. There then followed the washing and drying steps which were utilized in Example II.

The neutral galactose polymer prepared by the methods of any of the preceding examples provides at the 1% level of usage all of the structural integrity required for microbiological gel media, such as the following tube medium and plate medium.

*Tube medium*

| | | |
|---|---|---|
| (1) Peptone | grams | 1.0 |
| (2) Sodium chloride | do | 5.0 |
| (3) Dextrose | do | 1.0 |
| (4) Monopotassium phosphate | do | 2.0 |
| (5) Urea | do | 20.0 |
| (6) Phenol red | do | 0.012 |
| (7) Neutral galactose polymer | do | 11.0 |
| (8) Distilled water q.s. to | ml | 1000.0 |

*Plate medium*

| | | |
|---|---|---|
| (1) Protease peptone | grams | 10.0 |
| (2) Dextrose | do | 20.0 |
| (3) Neutral galactose polymer | do | 13.0 |
| (4) Distilled water q.s. to | ml | 1000.0 |

The neutral galactose polymer of this invention, of course, need not comprise the entire gel providing component of microbiological tube and plate media. For example, when 1.5% of conventional commercial agar and 0.5% of the neutral galactose polymer of this invention are admixed to comprise the total gel-forming component of tube and plate media, the admixture exhibits properties which are not possessed by such media in which no neutral galactose polymer is utilized and in which 2% of conventional commercial agar comprises the entire gel-forming component. Such admixture media will exude much less water of syneresis than will be exuded by the single component media. Also, the structural improvement provided by the lesser quantity of the neutral galactose polymer constituent makes it possible for the admixture media to withstand a far greater degree of physical shock than single component 2% conventional agar media are capable of withstanding. This resistance to shock can be extremely important when tube media is shipped by normal distribution and transportation means over long distances.

What I claim is:

1. The method for the preparation of a purified cold-water insoluble, neutral galactose polymeric constituent of agar from an agar which contains such polymeric constituent and, in addition, contains calcium and a cold-water insoluble, sulfated polysaccharide which comprises rendering the sulfated polysaccharide cold-water soluble by adding to the agar, under aqueous conditions, a solubilizing agent selected from the group consisting of pectinase enzyme and calcium sequesterant, and thereafter separating the cold-water insoluble constituent from the cold-water solubilized sulfated polysaccharide.

2. The method of claim 1 in which the calcium sequesterant is ethylene diamine tetraacetic acid.

3. The method of claim 1 in which the calcium sequesterant is an alkali metal salt of ethylene diamine tetraacetic acid.

4. The method of claim 1 in which the calcium sequesterant is a phosphate.

5. The method of claim 1 in which the calcium sequesterant is dibasic sodium triphosphate.

6. The method of claim 1 in which the calcium sequesterant is tribasic sodium phosphate.

7. The method of claim 1 in which the calcium sequesterant is sodium pyrophosphate.

8. The method of claim 1 in which the calcium sequesterant is sodium triphosphate.

9. The method of claim 1 in which the calcium sequesterant is sodium hexametaphosphate.

10. The method of claim 1 in which the calcium sequesterant is sodium tripolyphosphate.

References Cited

UNITED STATES PATENTS 3,281,409    10/1966    Blethen _____ 260—209

ALVIN E. TANENHOLTZ, *Primary Examiner.*